United States Patent [19]

Foglar

[11] Patent Number: 5,671,215

[45] Date of Patent: Sep. 23, 1997

[54] METHOD AND CIRCUIT ARRANGEMENT FOR TRANSMITTING MESSAGE CELLS VIA REDUNDANT, VIRTUAL PATH PAIRS OF AN ATM COMMUNICATION NETWORK

[75] Inventor: Andreas Foglar, Munich, Germany

[73] Assignee: Siemens Aktiengesellschaft, Munich, Germany

[21] Appl. No.: 303,523

[22] Filed: Sep. 9, 1994

[30] Foreign Application Priority Data

Sep. 16, 1993 [DE] Germany ............... 43 31 577.1

[51] Int. Cl.⁶ .................................................. H04J 3/14
[52] U.S. Cl. .......................... 370/227; 455/8; 370/217; 370/228; 370/232; 370/397
[58] Field of Search ........................... 370/16, 54, 60, 370/60.1, 94.1, 94.2, 217, 221, 225, 227, 228, 351, 352, 428, 397, 389, 232; 340/826, 827; 395/180.02; 371/62

[56] References Cited

U.S. PATENT DOCUMENTS

| | | | |
|---|---|---|---|
| 3,829,777 | 8/1974 | Muratani et al. | 455/8 |
| 4,241,445 | 12/1980 | Payen | 455/8 |
| 4,242,756 | 12/1980 | Huffman et al. | 455/8 |
| 4,347,605 | 8/1982 | Hashizume et al. | 370/16.1 |
| 4,692,918 | 9/1987 | Elliott et al. | 370/16 |
| 4,700,348 | 10/1987 | Ise et al. | 370/16 |
| 4,964,120 | 10/1990 | Mostashari | 370/16 |
| 5,091,902 | 2/1992 | Chopping et al. | 370/16.1 |
| 5,185,736 | 2/1993 | Tyrrell et al. | 370/55 |
| 5,241,534 | 8/1993 | Omuro et al. | 370/16 |
| 5,323,144 | 6/1994 | Imai et al. | 455/8 |
| 5,325,358 | 6/1994 | Goeldner | 370/60 |
| 5,345,445 | 9/1994 | Hiller et al. | 370/94.2 |
| 5,398,235 | 3/1995 | Tsuzuki et al. | 370/16 |
| 5,404,350 | 4/1995 | DeVito et al. | 370/16 |
| 5,406,564 | 4/1995 | Okita | 370/16 |
| 5,414,696 | 5/1995 | Tsuzuki et al. | 370/16 |
| 5,485,465 | 1/1996 | Liu et al. | 395/182.02 |

FOREIGN PATENT DOCUMENTS

| | | | |
|---|---|---|---|
| 2063936 | 9/1992 | Canada | H04J 3/14 |
| 0 384 936 A1 | 3/1989 | European Pat. Off. | H04L 12/56 |
| 0 505 601 A1 | 8/1991 | European Pat. Off. | H04L 12/56 |
| 0 506 396 A2 | 9/1992 | European Pat. Off. | H04L 12/42 |
| 0 542 233 A2 | 5/1993 | European Pat. Off. | H04L 12/56 |
| 43 17 951 C1 | 5/1994 | Germany | H04L 29/14 |

OTHER PUBLICATIONS

ICC '93 International Conference on Communications, Hiroshi Ohta et al, "Hitless Line Protection Switching Method for ATM Networks", pp. 272–276, 1993.

Primary Examiner—Douglas W. Olms
Assistant Examiner—Shick Hom
Attorney, Agent, or Firm—Hill, Steadman & Simpson

[57] ABSTRACT

A method and circuit arrangement for transmitting message cells via redundant virtual path pairs of an ATM communication network is provided. Two alternative solutions are employed for the transmission of message cells via virtual path pairs respectively formed of an active path and of an alternate path. A first solution is that the message cells transmitted via the active path and via the alternate path of a path pair are conducted up to the output of the switching network lying at the end of the corresponding path pair. Dependent on the number of message cells arriving via the active path and via the alternate path, a forwarding of the message cells of the active path or of the alternate path occurs proceeding from this point. The second solution is that the message cells of the alternate path are first discarded at the input of the corresponding switching network. Given an interruption of the active path, which is indicated to the switching network by an interrupt signal, by contrast the message cells arriving via the alternate path are forwarded by the switching network.

11 Claims, 2 Drawing Sheets

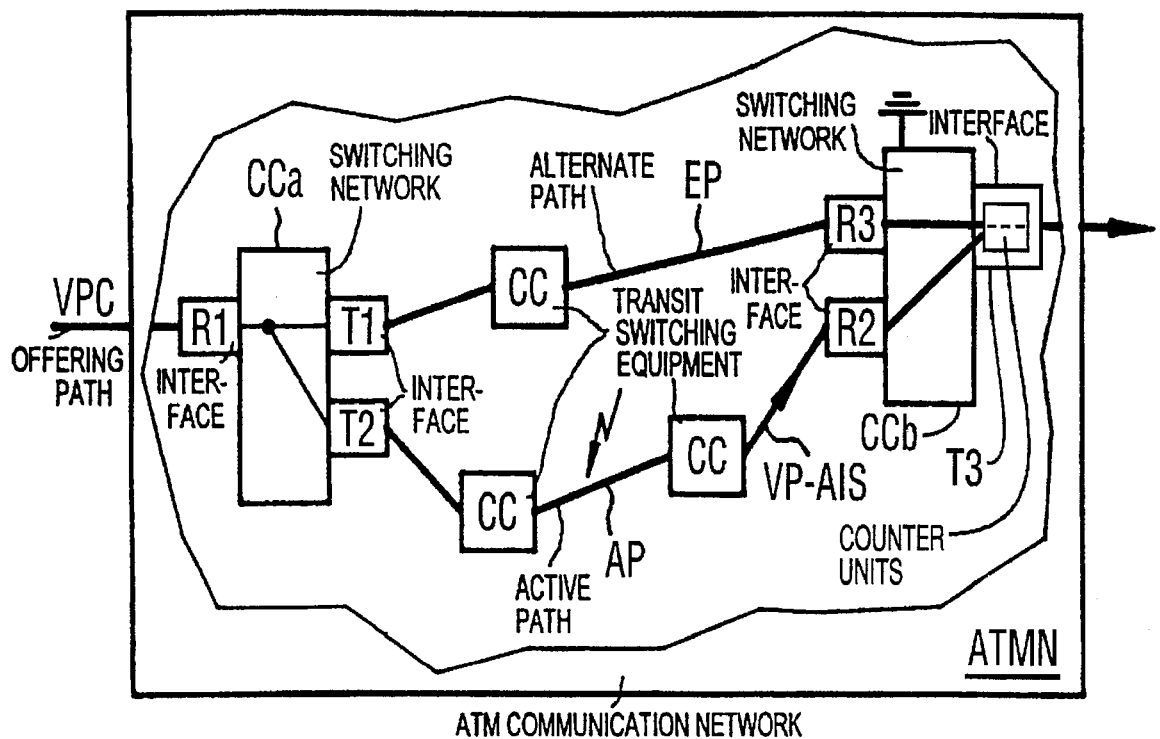

METHOD AND CIRCUIT ARRANGEMENT FOR TRANSMITTING MESSAGE CELLS VIA REDUNDANT, VIRTUAL PATH PAIRS OF AN ATM COMMUNICATION NETWORK

BACKGROUND OF THE INVENTION

The invention is directed to a method for transmitting message cells via redundant virtual path pairs of an ATM communication network operating according to an asynchronous transfer mode.

ATM communication networks offer the possibility of combining a plurality of virtual connections into bundles that are also referred to as virtual paths. Since such a virtual path can contain, for example, up to 65,536 virtual connections and can comprise a high aggregate bit rate of, for example, up to 2.4 Gbit/s, the corresponding virtual path must be capable of being switched as quickly as possible to an alternate route in case of malfunction in order to keep the information losses for the individual virtual connections low.

SUMMARY OF THE INVENTION

It is an object of the present invention to show a way how a method and a circuit arrangement of the type initially cited can be designed in order to be able to switch as quickly as possible to an alternate path allocated to an active path, given the occurrence of an error on the active path.

According to a method of the invention for transmitting message cells over redundant, virtual path pairs formed of an active path and of an alternate path in an ATM communication network operating according to an asynchronous transfer mode, the message cells to be transmitted via such a virtual path pair are duplicated by a switching network lying at the start of the respective path pair. The message cells allocated to one another are separately transmitted via the corresponding active path and alternate path. A switching network lying at the end of the respective virtual path pair normally forwards only the message cells transmitted via the corresponding active path, but discards message cells transmitted via the corresponding alternate path. With one embodiment of the invention, the message cells transmitted via the active path and the alternate path of the respective path pair are forwarded to that output of the switching network lying at the end of the respective path pair but which comes into consideration for the respective path pair. The number of message cells arriving via the active path and via the alternate path is continuously and separately acquired at the corresponding output. Given the presence of a number of message cells arriving via the alternate path that lies above the number of message cells arriving via the active path by a defined value, the message cells arriving via the alternate path are forwarded and the message cells arriving via the active path are discarded, Also according to a method of the invention, the message cells transmitted via the alternate path of the respective path pair are discarded at an input belonging to this alternate path in a switching network lying at the end of the respective path pair, but the message cells transmitted via the active path are forwarded via an input of the switching network belonging to the active path. Given an interruption of the active path of the respective path pair, an interrupt signal is transmitted in the direction toward the switching network lying at the end of the respective path pair from a switching network lying following the interrupt. In response to the appearance of such an interrupt signal in the switching network lying at the end of the respective path pair, the input belonging to the alternate path or the input belonging to the active path is controlled by an internal control signal such that subsequent thereto the message cells transmitted via the alternate path are forwarded and the message cells transmitted via the active path are discarded.

An advantage of the invention is that a switch to an alternate path allocated to an active path can be made with little control expense given outage of an active path. A further advantage of the invention is the separate acquisition of the plurality of message cells to be transmitted via the active path and via the alternate path. As a result thereof, a switch to the alternate path can already be made, given an increased loss of message cells on the active path without the presence of a complete outage.

In an advantageous development of the method, depending on the number of message cells arriving, the switching network lying at the start of the respective virtual path pair inserts synchronization cells between the message cells transmitted via the corresponding active path and alternate path at prescribed time intervals. The plurality of message cells transmitted via the active path and via the alternate path is respectfully set to a uniform initial value due to the appearance of the synchronization cells in a switching network lying at the end of the respective path. The advantage of this development is in the transmission of synchronization cells and their interpretation in the switching network lying at the end of the respective path pair in order to set the plurality of message cells transmitted via an active path and via a corresponding alternate path to a respectively uniform initial value at predetermined time intervals. Even when message cells are transmitted via an active path and via the corresponding alternate path with different cell loss probabilities, it is assured in this way that the difference between the plurality of message cells transmitted via an active path and message cells transmitted via the corresponding alternate path in the normal case lies below a threshold defined for a path switch-over.

In a further development of the invention, a separate internal cell header for the active path and the alternate path is placed preceding each of the message cells accepted by the respective switching network in an ATM communication network having switching networks designed in multi-stage fashion. They are placed in this fashion based on the criterion of the cell header respectively allocated to this message cell. A plurality of header paths corresponding to the plurality of switching stages is contained in the internal cell header in a sequence of the switching stages to be traversed within the respective switching network. The move through the respective switching stage is respectively defined by the header parts. The header parts of the internal cell headers allocated to one another and determinate for the respective switching stage are compared to one another by each of the switching stages of the respective switching network given the appearance of a message cell. Given an identity of the header parts compared to one another, the corresponding message cell is forwarded according to the criterion of the identical header parts. Given a non-identity of the header parts compared to one another, by contrast, the corresponding message cell is duplicated. The two message cells resulting therefrom are forwarded separately according to the criterion of one of the header parts compared to one another and, together with this individual forwarding, the header parts following the respective header part and belonging to the same internal cell header are retained in unmodified fashion, but the header parts of the other internal cell header are marked as being invalid. When one of the header parts compared to one another is marked as being invalid, the corresponding message cell is forwarded only according to the criterion of the remaining valid header part.

The advantage of this development is that, given switching networks designed in multi-stage fashion, the individual message cells are first duplicated for a transmission via a path pair in that switching stage in which the two different transmission paths branch. The additional load on the respective switching network due to the duplicated message cells thus remains minimal.

Also according to the invention, a circuit arrangement is provided for transmitting message cells via redundant virtual path pairs respectively formed of an active path and of an alternate path in an ATM communication network operating according to an asynchronous transfer mode. The message cells to be transmitted via such a virtual path pair are duplicated by a switching network lying at the start of the respective path pair, and the message cells allocated to one another are separately transmitted via the corresponding active path and alternate path. The switching network lying at the end of the virtual path pair normally forwards only the message cells transmitted via the corresponding active path but discards the message cells transmitted via the corresponding alternate path. The message cells transmitted via the active path and via the alternate path of the respective path pair are forwarded to the output coming into consideration for the respective path pair in the switching network lying at the end of the respective path pair. Counting means is provided at the corresponding output which continuously and separately acquires the number of message cells arriving via the active path and via the alternate path. Control means is provided which, given the presence of a number of message cells arriving via the alternate path that lies above the number of message cells arriving via the active path by a defined value, controls the corresponding output such that the message cells arriving via the alternate path are forwarded but the message cells arriving via the active path are discarded. The advantage of this circuit arrangement is that a comparatively slight circuit-oriented expense results in order to be able to implement a fast switching between the active path and the corresponding alternate path, given a path pair.

An especially low circuit expense results when the counting means are designed in conformity with the following circuit-oriented techniques:

1) the counting means are formed of a counter allocated to the active path as well as a counter allocated to the alternate path, the momentary counter readings of the counters being supplied to a means for forming the difference between the momentary counter readings; and 2) the counting means are formed of a forward/backward counter whose momentary counter reading is variable in one direction with every appearance of a message cell transmitted via the active path but is variable in the other direction with every appearance of a message cell transmitted via the alternate path.

BRIEF DESCRIPTION OF THE DRAWINGS

FIG. 1 shows portions of an ATM communication network wherein the present invention is employed in a block circuit diagram;

FIG. 2 shows the schematic structure of message cells that are respectively transmitted within the switching networks indicated in FIG. 1.

DESCRIPTION OF THE PREFERRED EMBODIMENTS

Figure 3:
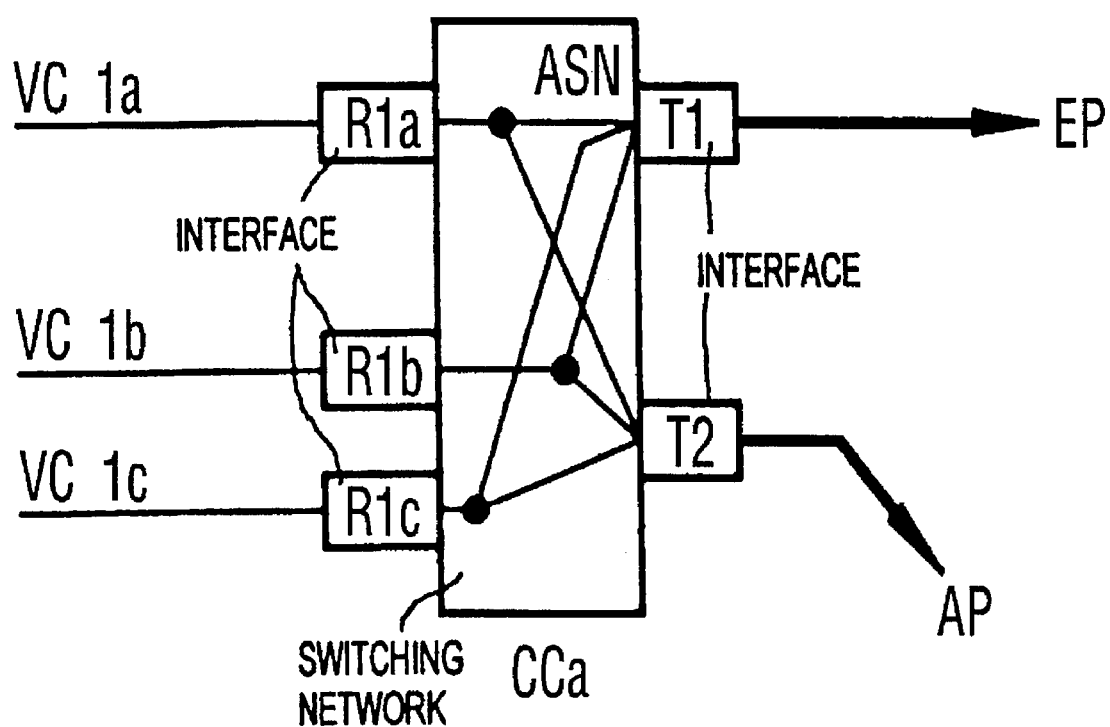
FIG. 3 schematically shows the involvement of a plurality of virtual connections into a virtual path pair.

FIG. 1 shows portions of an ATM communication network ATMN operating according to an asynchronous transfer mode which is formed of a plurality of switching networks, and which may be assumed to serve, for example, as an offering network for larger ATM switching networks. Within this ATM communication network, virtual connections that proceed in the same direction and are set up in a known way are conducted via what are referred to as virtual paths, i.e. these virtual paths each respectively carry a plurality of virtual connections. Let the switching networks thereby be designed, for example, as what are referred to as cross connects via which virtual paths are permanently established and continue to exist over a longer time. Since such a virtual path can contain, for example, up to 65,536 virtual connections and can also have a high aggregate bit rate of, for example, up to 2.4 Gbit/s, such a path must be switched as quickly as possible to an alternate route in case of malfunction in order to assure an optimally low loss of message cells transmitted within the individual virtual connections. For this purpose, an alternate path is defined within the ATM communication network for every path referred to below as an active path. The respective active path and the corresponding alternate path are referred to below as a path pair. The active path and the corresponding alternate path thereby proceed via separate routes in order to achieve a high degree of reliability against outage. For example, the same optical fiber bundle within the ATM communication network is not used for these two paths insofar as possible.

Representing a plurality of virtual path pairs proceeding within the ATM communication network, FIG. 1 schematically shows a virtual path pair established between two switching networks. The switching networks are thereby referenced CCa and CCb. The switching equipment CCa represents the beginning of the virtual path pair and is supplied with the message cells appearing within an offering path VPC at an interface R1. The active path AP proceeds from the switching equipment CCa via an interface means T2 connected thereto as well as via transit switching equipment CC to an interface means R2 of the switching equipment CCb. The corresponding alternate path EP, by contrast, is established via an interface means T1 belonging to the switching equipment CCa and via a transit switching equipment CC to an interface means R3 of the switching equipment CCb. As shall be set forth below, the message cells supplied to the switching equipment CCa via the interface means R1 are respectively duplicated, and the message cells allocated to one another are separately transmitted to the switching equipment CCb via the active path and via the alternate path. In this switching equipment CCb, the message cells transmitted via the alternate path are discarded in the normal case and only the message cells transmitted via the active path are forwarded to an interface means T3 representing an output of the switching equipment CCb. Only given the appearance of disturbances on the active path is a switch to the corresponding alternate path made, i.e. the message cells arriving via this alternate path are forwarded to the interface means T3, whereas the message cells potentially still arriving via the active path are suppressed.

The duplication of the message cells within the switching equipment CCa shall now be discussed first with reference to FIG. 2. For this purpose, it is assumed that the switching networks of the ATM communication network and, thus the switching network CCa, are each respectively designed in multi-stage fashion, and that the message cells are transmitted within the respective switching equipment according to what is referred to as the self-routing principle. According to this principle, an internal cell header, upon entry of every message cell into the respective switching equipment, is placed preceding this message cell in addition to the existing, external cell header and based on the criterion of this cell header. This internal cell header comprises a plurality of header parts corresponding in number to the plurality of switching stages of the respective switching network with which the respective path through the respective switching stage, i.e., for example, the output of the switching stage, is defined. The sequence of the header parts thereby corresponds to the sequence in which the switching stages of the respective switching network—the switching network CCa in this case—are to be traversed.

It is then provided in the present exemplary embodiment that each of the message cells is preceded by two internal cell headers, namely one for the active path and the remaining cell header for the alternate path. A validity bit is thereby attached to each header part, this validity bit being first set to a defined logical level, for example to the logical level "1".

Upon passage of a message cell through, for example, the switching network CCa, the header parts of the two internal cell headers allocated thereto are compared to one another in each switching stage. Given an identity of these header parts, the corresponding message cell is forwarded to the following switching stage based on the criterion of the muting information contained in the identical header parts, i.e. based on the criterion of the designation of the output to be employed. The validity bits of the header parts just compared to one another are thereby destroyed. Given a non-identity of the header parts compared to one another, by contrast, the message cell present at the moment is duplicated. The two message cells resulting therefrom are then forwarded over different routes within the respective switching stage based on the criterion of one of the two header parts. The validity bits are thereby destroyed in the header part just considered for the forwarding as well as in the header parts of the respectively other internal cell header. When one of the header parts compared to one another is marked as invalid (validity bit is erased), finally the corresponding message cell is forwarded only based on the criterion of the routing information contained in the valid header part.

As an example, FIG. 2 shows that case wherein a message cell is preceded by two internal cell headers a and b, whereby each of these internal cell headers comprises five header parts in order to forward the message cell within a five-stage switching network. The numeral indicated in the respective header part thereby indicates the output to be employed at the respective switching stage. Over and above this, every header part has a validity bit attached to it which is first set to the logical level "1". As derives from the illustrated example, the routing information contained in the first two header parts of the internal cell headers are identical (5, 20). The corresponding message cell is thus transmitted via the output 5 of the first switching stage and via the output 20 of the second switching stage to the third switching stage. The validity bits of these header parts are thereby destroyed. The header parts allocated to the third switching stage are deviated from one another, so that the message cell is duplicated in this third switching stage. The two message cells resulting therefrom are subsequently forwarded via the outputs 1 and 17 of the third switching stage. The validity bit is thereby respectively destroyed in the header part of the internal cell header a allocated to the third switching stage in the message cell forwarded via the route a (active path), and is also destroyed in all header parts of the internal cell header b. Correspondingly, the validity bit is receptively destroyed in the header part allocated to the third switching stage in the message cell transmitted via the route b (alternate route), and is also destroyed in all header parts of the internal cell header a. Subsequently, the two message cells that proceeded from the duplicating are forwarded in the remaining switching stages 4 and 5 only based on the criterion of the internal cell header provided for the respective route. The statuses of the validity bits for the individual header parts after stages 1–5 for the two routes a and b are shown again in FIG. 2 in the table shown to the right next to the message cell.

The control events that have been set forth above also repeat in the transit switching networks CC and in the switching network CCb in FIG. 1. Since no duplication of message cells occurs in these switching networks given the assumed example, every entering message cell is preceded by two identical internal cell headers. The forwarding of the message cells within the respective switching network then occurs based on the criterion of the identical header parts contained in the internal cell headers.

The procedure set forth above for transmitting message cells via separate routes, i.e. via an active path and via an alternate path, yields the advantage that the individual message cells are only duplicated in that switching stage of the switching network where the two paths in fact branch. The load on the respective switching network due to the duplication of the message cells thus remains minimal.

Moreover, let it also be noted that the duplicating of message cells set forth above is especially easy to realize in a switching stage when a central memory ("shared memory") as well as output queues allocated thereto are provided within the individual switching elements of this switching stage. In this case, the respective message cell is deposited only once in the central memory and is read out twice, namely whenever this message cell is pending as the next way of transmission in the respective output queue.

That case shall be discussed below wherein a disturbance occurs in the above-explained transmission of message cells via the active path of the path pair in FIG. 1, whereupon the message cells transmitted via this active path are to be discarded by the switching network CCb and the message cells supplied via the alternate path are to be forwarded instead via the interface means T3. According to a first exemplary embodiment, it is initially provided for this purpose that the interface means R2 lying in the active path is switched to transmission, whereas the message cells arriving via the interface means R3 lying in the alternate path are discarded. Given an interruption of the active path, this being symbolized in FIG. 1 with a "lightning" symbol, the transmit switching network CC following after this interruption enters a signalling cell into the message cell stream that is transmitted to the switching network CCb and is recognized therein. For example, an alarm cell "VP-AIS" as defined according to CCITT Recommendation I.610 can thereby be used as a signalling cell. In response to the appearance of such a signalling cell, the interface means R2 lying in the active path is inhibited by the switching network CCb, and the alternate path is connected through via the interface means R3 with the assistance of a control signal transmitted to the interface means R3.

In a further exemplary embodiment, the active path and the alternate path of the path pair shown in FIG. 1 are actively conducted up to the interface means T3 of the switching network CCb, i.e. the message cells to be transmitted via the alternate path are discarded at this location in the normal case. In addition, the plurality of message cells arriving via the active path and arriving via the alternate path are separately and continuously acquired at this interface means. Due to the differences in running time and due to the fluctuations in running time that are unavoidable given the asynchronous transfer mode, a difference will generally occur in the acquired values, but this will not assume arbitrarily high values in a normal case. When, however, a disturbance in the form, for example, of an interruption appears on the active path, then the number of message cells identified for the alternate path will rise substantially compared to the number of message cells identified for the alternate path. When the difference between these two values thereby exceeds a defined threshold, then the message cells potentially still arriving via the active path are discarded by the interface means T3, whereas the message cells arriving via the alternate path are forwarded. As a result of this procedure, the switching occurs significantly faster than the afore-mentioned switching with the assistance of the interface means R2 and R3.

Counting means are provided in the interface means T3 for the above-described acquisition of the message cells transmitted via the active path and via the alternate path. These counting means can be formed of a counter allocated to the active path as well as of a counter allocated to the alternate path whose momentary counter readings are supplied to a means for forming the difference between the momentary counter readings. Based on the criterion of the output signals output by this means, these output signals being dependent on the respective difference, a through-connection of the message cells transmitted via the active path or via the alternate path then occurs. Alternatively thereto, the counting means can be formed by a forward/backward counter whose momentary counter reading is variable in the one direction with each appearance of a message cell transmitted via the active path but, by contrast, is variable in the other direction with the appearance of a message cell transmitted via the alternate path. In this case, the forwarding of the message cells arriving via the active path, or respectively via the alternate path, occurs according to the criterion of the momentary counter reading of this forward/backward counter.

Regardless of the realization of the counting means, differences in counter reading, or respectively momentary counter reading, in response to which the abovedescribed monitoring mechanisms erroneously respond, can occur without suitable control measures in that case when message cells having different cell loss probabilities are transmitted via the active path and via the alternate path. In order to preclude this, the switching network CCa in the present exemplary embodiment inserts synchronization cells into the message cell streams transmitted via the active path and via the alternate path at defined time intervals. With the appearance of these synchronization cells in the switching network CCb, the momentary counter reading of the afore-mentioned counting means is set to a defined initial value.

The following estimate should serve the purpose of dimensioning the counting means as well as of defining the time intervals provided for the transmission of the synchronization cells. The difference in running time for the message cells to be transmitted within the ATM communication network is essentially established by the differences in the geometrical route lengths. A route length of 1000 km is surely a maximum value here if one leaves satellite connections out of consideration. 1000 km thereby corresponds to a running time of 4 ms. Values of approximately 300 μs are currently proposed for the maximum variation in running time given passage through a switching network. In the extreme case, the alternate path could then proceed via ten switching networks and a path length of 1000 km, whereas the active path proceeds via a single switching network, has a low load, and produces nearly no delay. The maximum difference in running time amounts to 7 ms, this corresponding to approximately 2500 cell cycles. When a virtual connection having, for example, a bit rate of two Mbit/s is involved, whereby a message cell is transmitted approximately every 60 cell clocks on average, then it follows therefrom that the difference between the afore-mentioned counter readings for the two paths, i.e. for the active path and for the alternate path, can amount to at most approximately 42. In this case, a value above 42 could thus be defined as the threshold of the afore-mentioned switch-over mechanism.

When a value of $10^{-5}$ is assumed as the cell loss probability, then this is surely a relatively high value. Given this value, an average of one message cell is lost after respectively 100,000 message cells, which corresponds to a time interval of 0.28 s. It is thus sufficient to insert a respective synchronization cell into the message streams at a spacing of a few seconds. For example, the "performance monitoring" cells already defined in CCITT Recommendation L610 could therefore be employed as synchronization cells.

The above-described methods can also be employed when the path pair shown in FIG. 1 is formed, for example, in the switching network CCa or, respectively, is in turn cleared down in the switching network CCb. An example of this is recited in FIG. 3 for the switching network CCa. As proceeds therefrom, the redundant path pair (active path AP and alternate path EP) is formed of three virtual connections VC1a, VC1b and VC1c. Message cells occurring during the course of these virtual connections are therefore supplied to the switching network CCa via interface means R1a, R1b and R1c. These message cells are duplicated in the switching network CCa according to the above-described principle. The redundancy is then in turn cancelled in the switching network CCb in the interface means R2 and R3 shown in FIG. 1 or at the three interface outputs T3a, T3b and T3c. The afore-mentioned counting means are therefore to be individually provided for the respective virtual connection in these interface means. Beyond this, the afore-mentioned synchronization cells are to be separately transmitted for each of the virtual connections.

In conclusion, let it also be pointed out that switching equipment via which the virtual connections belonging to a virtual path pair are only set up during the course of a call set up can be provided as a switching network in the ATM communication network shown in FIG. 1 instead of "cross connects."

Although various minor changes and modifications might be suggested by those skilled in the art, it will be understood that I wish to include within the claims of the patent warranted hereon, all such changes and modifications as reasonably come within my contribution to the art.

I claim as my invention:

1. A method for transmitting message cells for redundant, virtual path pairs formed of an active path and of an alternate path in an ATM communication network operating according to an asynchronous transfer mode, comprising the steps of:

for each virtual path pair, duplicating message cells to be transmitted via the path pair by a start switching network lying at a start of the respective path pair, the message cells allocated to one another being separately transmitted via the corresponding active path and alternate path;

providing an end switching network lying at an end of the respective virtual path pair;

forwarding message cells transmitted via the active path and the alternate path of the respective path pair to respective outputs of the end switching network, and continuously and separately but simultaneously counting a number of message cells arriving via the active path and via the alternate path; and if the number of message cells arriving via the alternate path is higher than the number of message cells arriving via the active path by a defined value, the message cells arriving via the alternate path are forwarded but the message cells arriving via the active path are discarded.

2. A method according to claim 1 including the steps of:

with the start switching network of the respective virtual path pair, inserting synchronization cells between the message cells transmitted via the corresponding active path and alternate path at prescribed time intervals; and setting the number of message cells transmitted via the active path and via the alternate path to a uniform initial value due to appearance of the synchronization cells in the end switching network of the respective path.

3. A method according to claim 1 including the steps of:

providing a separate internal cell header for the active path and the alternate path preceding each of the message cells accepted by the respective switching network in an ATM communication network having switching networks designed in multi-stage fashion, and being placed in this fashion based on a criterion of the cell header respectively allocated to this message cell, and a plurality of header parts corresponding to the plurality of switching stages being contained in said internal cell header according to a sequence of the switching stages to be traversed within a respective switching network;

respectively defining by said header parts a route through the respective switching stage;

comparing to one another the header parts of the internal cell header allocated to one another and being determinate for the respective switching stage by each of the switching stages of the respective switching network given appearance of a message cell;

given an identity of the header parts compared to one another, forwarding the corresponding message cell according to the criterion of the identical header parts;

given a non-identity of the header parts compared to one another, duplicating the corresponding message cell, the two message cells resulting therefrom being forwarded separately according to the criterion of one of the header parts compared to one another and, together with this individual forwarding, retaining unmodified header parts following the respective part and belonging to the same internal cell header, and the header parts of the other internal cell header being marked as being invalid; and when one of the header parts compared to one another is marked as being invalid, forwarding the corresponding message cell only according to the criterion of the remaining, valid header part.

4. A method for transmitting message cells for redundant, virtual path pairs formed of an active path and of an alternate path in an ATM communication network operating according to an asynchronous transfer mode, comprising the steps of:

for each virtual path pair, duplicating message cells to be transmitted via the path pair by a start switching network lying at a start of the respective path pair, the message cells allocated to one another being separately transmitted via the corresponding active path and alternate path;

providing an end switching network having an output interface at outputs thereof and lying at an end of the respective virtual path pair;

forwarding message cells transmitted via the active path and the alternate path of the respective path pair to respective outputs of the end switching network, and continuously and separately but simultaneously counting a number of message cells arriving via the active path and via the alternate path; and if the number of message cells arriving via the alternate path is higher than the number of message cells arriving via the active path by a defined value, the message cells arriving via the alternate path are forwarded by the output interface but the message cells arriving via the active path are discarded.

5. A method for transmitting message cells for redundant, virtual path pairs respectively formed of an active path and of an alternate path in an ATM communication network operating according to an asynchronous transfer mode, comprising the steps of:

duplicating message cells to be transmitted via each of the virtual path pairs by providing a start switching network lying at a start of the respective path pair, message cells allocated to one another being separately transmitted via the corresponding active path and alternate path;

providing an end switching network lying at an end of the respective virtual path pair;

providing at least one intermediate switching network in each of said active and alternate paths of the respective path pair between the beginning and end switching networks;

initially discarding message cells transmitted via the alternate path of the respective path pair at an input interface of the end switching network of the respective path pair, but forwarding the message cells transmitted via the active path via an input interface of said end switching network belonging to said active path;

given an interruption of the active path of the respective path pair occurring prior to said intermediate switching network, transmitting an interrupt signal in a direction toward the end switching network of the respective path pair from said intermediate switching network lying following the interrupt; and in response to appearance of said interrupt signal at the end switching network of the respective path pair, controlling either the input interface belonging to the alternate path or the input interface belonging to the active path by an internal control signal such that subsequent thereto message cells transmitted via the alternate path are forwarded but message cells transmitted via the active path are discarded.

6. A method according to claim 5 including the steps of:

providing a separate internal cell header for the active path and the alternate path preceding each of the message cells accepted by the respective switching network in an ATM communication network having switching networks designed in multi-stage fashion, and being placed in this fashion based on a criterion of the cell header respectively allocated to this message cell, and a plurality of header parts corresponding to the plurality of switching stages being contained in said internal cell header according to a sequence of the switching stages to be traversed within a respective switching network;

respectively defining by said header parts a route through the respective switching stage;

comparing to one another the header parts of the internal cell header allocated to one another and being determinate for the respective switching stage by each of the switching stages of the respective switching network given appearance of a message cell;

given an identity of the header parts compared to one another, forwarding the corresponding message cell according to the criterion of the identical header parts;

given a non-identity of the header parts compared to one another, duplicating the corresponding message cell, the two message cells resulting therefrom being forwarded separately according to the criterion of one of the header parts compared to one another and, together with this individual forwarding, retaining unmodified header parts following the respective part and belonging to the same internal cell header, and the header parts of the other internal cell header being marked as being invalid; and when one of the header parts compared to one another is marked as being invalid, forwarding the corresponding message cell only according to the criterion of the remaining, valid header part.

7. A method for transmitting message cells for redundant, virtual path pairs respectively formed of an active path and of an alternate path in an ATM communication network operating according to an asynchronous transfer mode, comprising the steps of:

duplicating message cells to be transmitted via each of the virtual path pairs by providing a start switching network lying at a start of the respective path pair, message cells allocated to one another being separately transmitted via the corresponding active path and alternate path;

providing an end switching network having an output interface and lying at an end of the paths of the respective path pair between the beginning and end switching networks;

providing at least one intermediate switching network in each of said active and alternate respective virtual path pair;

initially discarding message cells transmitted via the alternate path of the respective path pair at an input interface in the end switching network of the respective path pair, but forwarding to said output interface the message cells transmitted via the active path via an input interface of said end switching network belonging to this active path;

given an interruption of the active path of the respective path pair, transmitting an interrupt signal in a direction toward the end switching network of the respective path pair from said switching intermediate switching network lying following the interrupt; and in response to appearance of said interrupt signal at the end switching network of the respective path pair, forwarding at the input interface of the alternate path to said output interface message cells which are then transmitted via the alternate path and stopping transmission of message cells via the active path at the input interface thereof.

8. A circuit arrangement for transmitting message cells in an ATM communication network operating according to an asynchronous transfer mode, comprising:

redundant, virtual path pairs respectively formed of an active path and of an alternate path for redundantly transmitting message cells;

a start switching network lying at a start of the respective path pair for duplicating message cells to be transmitted via the respective virtual path pair, message cells allocated to one another being separately transmitted via the corresponding active path or alternate path;

an end switching network lying at an end of the respective virtual path pair;

said end switching network of the respective path pair forwarding the message cells transmitted via the active path and via the alternate path to respective outputs thereof;

a counting unit being provided for each of the corresponding outputs of the respective end switching network for continuously and separately but simultaneously determining a number of message cells arriving via the active path and a number of message cells arriving via the alternate path; and when the number of message cells arriving via the alternate path that lies above the number of message cells arriving via the active path by a defined value, said counting units controlling the corresponding outputs such that said message cells arriving via the alternate path are forwarded but the message cells arriving via the active path are discarded.

9. A circuit arrangement according to claim 8 wherein the counting units are formed of a counter allocated to the active path as well as of a counter allocated to the alternate path, and outputs of said counters being connected such that momentary counter readings of said counters are supplied to a unit for forming the difference between the momentary counter readings.

10. A circuit arrangement according to claim 8 wherein the counting units are formed of a forward/backward counter whose momentary counter reading is variable in one direction with every appearance of a message cell transmitted via the active path but is variable in another direction at every appearance of a message cell transmitted via the alternate path.

11. A circuit arrangement for transmitting message cells in an ATM communication network operating according to an asynchronous transfer mode, comprising:

redundant, virtual path pairs respectively formed of an active path and of an alternate path for redundantly transmitting message cells;

a start switching network lying at a start of the respective path pair for duplicating message cells to be transmitted via the respective virtual path pair, message cells allocated to one another being separately transmitted via the corresponding active path or alternate path;

an end switching network lying at an end of the respective virtual path pair having an output interface at outputs thereof;

said end switching network of the respective path pair forwarding the message cells transmitted via the active path and via the alternate path to respective outputs of said end switching network, an output interface being provided at said respective outputs;

a counting unit being provided for each of the corresponding outputs of the respective end switching network for continuously and separately but simultaneously determining a number of message cells arriving via the active path and a number of message cells arriving via the alternate path; and when the number of message cells arriving via the alternate path that lies above the number of message cells arriving via the active path by a defined value, said counting units controlling the corresponding outputs such that said message cells arriving via the alternate path are forwarded by the output interface but the message cells arriving via the active path are discarded.

* * * * *